United States Patent [19]

Wildhaber

[11] 4,044,632
[45] Aug. 30, 1977

[54] TWIN CHANNEL REDUCTION DRIVE WITH ELECTRIC MOTOR

[76] Inventor: Ernest Wildhaber, 124 Summit Drive, Rochester, N.Y. 14620

[21] Appl. No.: 576,103

[22] Filed: May 9, 1975

[51] Int. Cl.$^2$ .................. F16H 37/06; F16H 57/00
[52] U.S. Cl. ............................. 74/665 G; 74/410; 74/665 GD
[58] Field of Search ......... 74/665 F, 665 G, 665 GD, 74/665 GC, 665 GB, 665 GA, 410

[56] References Cited

U.S. PATENT DOCUMENTS

| 2,236,464 | 3/1941 | Burns | 74/665 GD X |
| 2,396,781 | 3/1946 | Glynn | 74/665 GB X |
| 2,943,504 | 7/1960 | Falk et al. | 74/665 GD X |
| 2,982,144 | 5/1961 | Wallgren | 74/410 |
| 3,367,210 | 2/1968 | Scott | 74/410 X |
| 3,397,589 | 8/1968 | Moore | 74/410 X |
| 3,444,751 | 5/1969 | Good | 74/665 GA X |
| 3,517,566 | 6/1970 | Cornford | 74/410 X |
| 3,839,922 | 10/1974 | Hiersig et al. | 74/410 |
| 3,888,138 | 6/1975 | Hiersig | 74/665 GC X |

Primary Examiner—Samuel Scott
Assistant Examiner—Lance W. Chandler

[57] ABSTRACT

The present invention applies to large and powerful geared mixer drives and aerators and broadly to geared reduction drives with a plurality of reducing steps, where the axis of an electric motor is offset from the axis of the power consumer and disposed at right angles to said axis. The drive of a single motor is split up into two channels that apply power to a common final drive gear in two diametrically opposite places. Means are provided to equalize the loads in both places, at all loads. Thus a turning moment is exerted rather than a one-sided driving load. It balances the turning moment of the power consumer directly and with least deflections. It also drastically reduces the size and weight of the drive.

4 Claims, 6 Drawing Figures

TWIN CHANNEL REDUCTION DRIVE WITH ELECTRIC MOTOR

One object of the present invention is to drastically reduce the size and weight of such a drive. A further aim is to use smaller gears that can be produced with most efficient methods. Another object is to provide a design that in many cases may use a a single final drive shaft rather than a separate and independently journalled sleeve for mounting the drive gear and an independently journalled shaft coaxial therewith, that carries the working elements. A further object is the ability to readily convert the equipment for a modified use that requires a different gear ratio, by changing a pair of coaxial cylindrical drive pinions and the center distance. A further aim is to drive with an electric motor offset from the final drive shaft and disposed at right angles thereto. Another object is to provide a more compact design by mounting the electric motor in between its pair of cylindrical drive pinions. Other objects will appear in the course of the specification and in the recital of the appended claims.

The invention will be described with reference to the drawings, which refer to a large mixer drive, and where FIG. 1 is a cross-section taken at right angles to the axis of the power consumer, here the axis of the mixer shaft.

Figure 1:
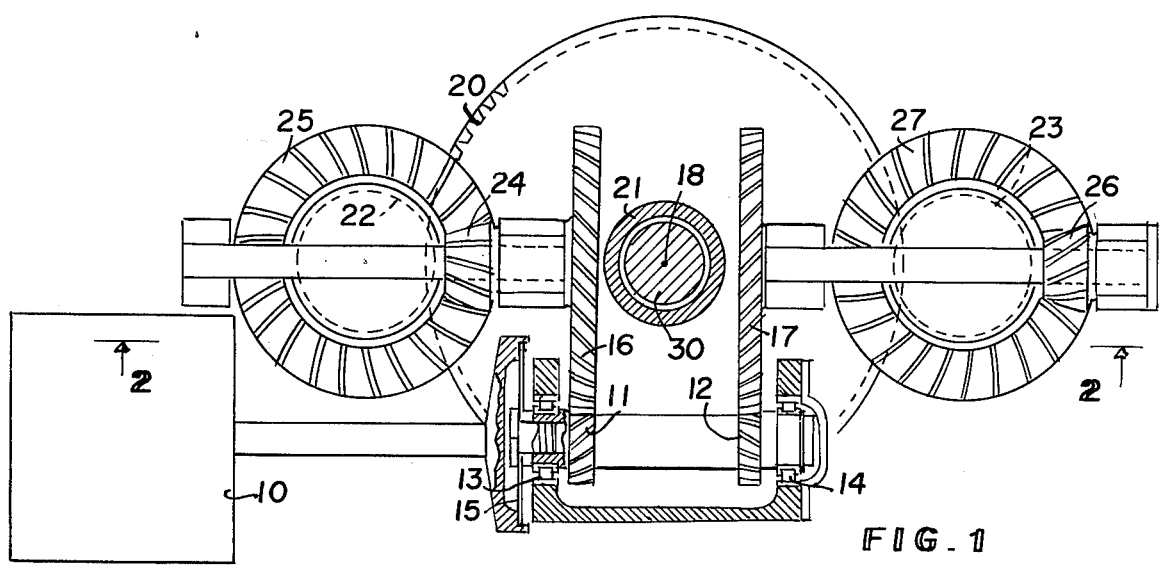
Figure 2:
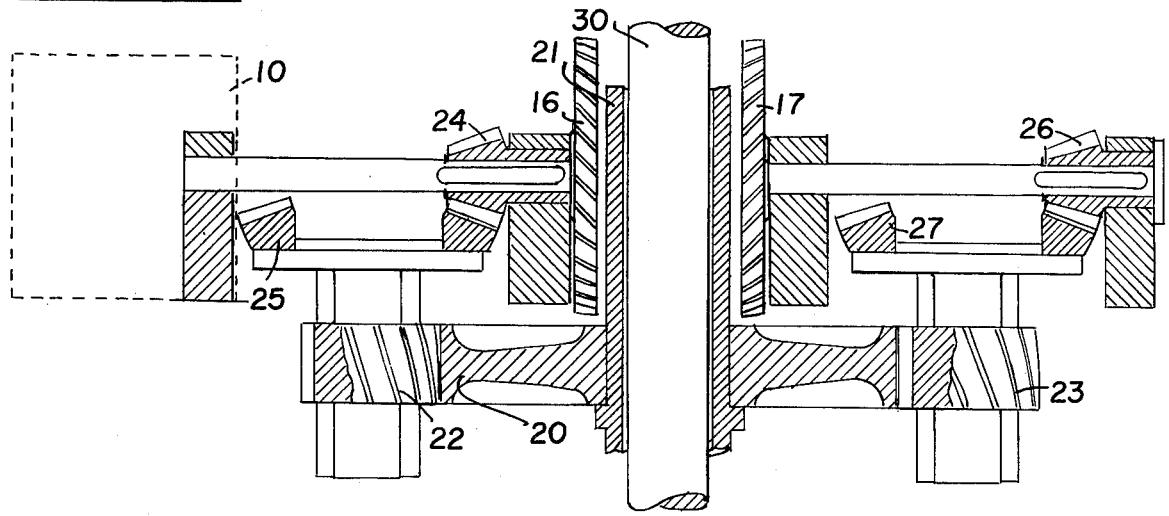
FIG. 2 is a front elevation thereof, and a section taken along lines 2—2 of FIG. 1.

Referring now to FIGS. 1 and 2, the electric motor 10 drives a pair of coaxial cylindrical pinions 11, 12 formed integral with each other. They contain helical teeth of opposite hand and equal lead, and are mounted for axial self-adjustment in roller bearings 13, 14. Their drive from the motor 10 permits small axial displacements with minimal frictional resistance, so that their tooth loads are equalized. The drive specifically shown is through one or more thin steel disks 15. These are secured on the outside periphery to the motor shaft, and on the inside to the pinion member 11, 12 by means of a fixed face coupling.

According to the invention the equal torques applied to the two pinions 11, 12 are transmitted to a common final drive gear through separate channels, to exert essentially a pure torque thereon.

The helical pinions 11, 12 mesh with helical gears 16, 17 respectively, whose axes are parallel to the axis of pinions 11, 12 and intersect the axis 18 of the final drive gear 20 at right angles. Gear 20 is a cylindrical gear with either helical or straight teeth. It is secured to a sleeve 21 journalled in known practice on a pair of axially spaced bearings, (not shown). It is rotated by a pair 22, 23 of cylindrical mating pinions placed on diametrically opposite sides of gear 20. Their axes are parallel to axis 18. Pinion 22 receives motion from gear 16 through a bevelgear pair 24, 25, while pinion 23 is rotated by gear 17 through a bevelgear pair 26, 27.

Figure 3:
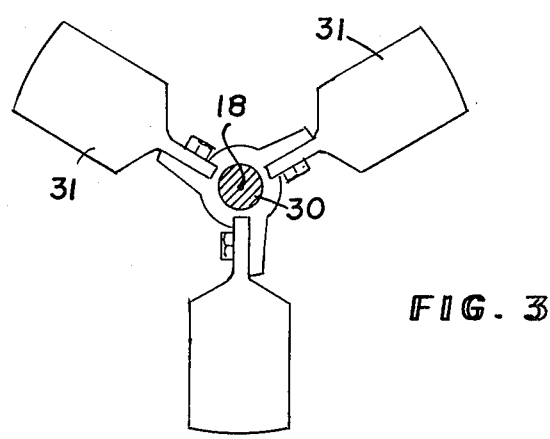
FIG. 3 is a reduced-scale view looking along the axis of the mixer shaft of the power consumer, showing a plurality of working parts equally spaced about said axis.

Sleeve 21 is connected to and encloses the main shaft 30, that extends vertically into the medium to be acted on. FIG. 3 is a diagrammatic reduced-scale view of shaft 30 and the working parts 31. They are equally spaced about axis 18. In the known design mentioned the shaft 30 is independently journalled in spaced bearings. The several equal parts 31 exert close to a pure torque on shaft 30. This torque is balanced by something like a pure driving torque exerted on the final drive gear 20 by the diametrically opposite pinions 22, 23.

The absence of a one-sided driving load minimizes the bearing loads and very much decreases the shaft deflections. In many cases it becomes feasible to do away with the sleeve 21 and to use only a main shaft 30. This simplifies the design and reduces cost.

The use of cylindrical gear pairs in the first reduction step permits placing the motor in a convenient offset location. It also permits the equipment to be changed over to a different speed, by changing the pair of coaxial pinions 11, 12 while leaving their gears 16, 17 alone, and setting up the drive shaft in a parallel position. An increase or decrease in the center distance decreases or increases the reduction ratio respectively.

Figure 4:
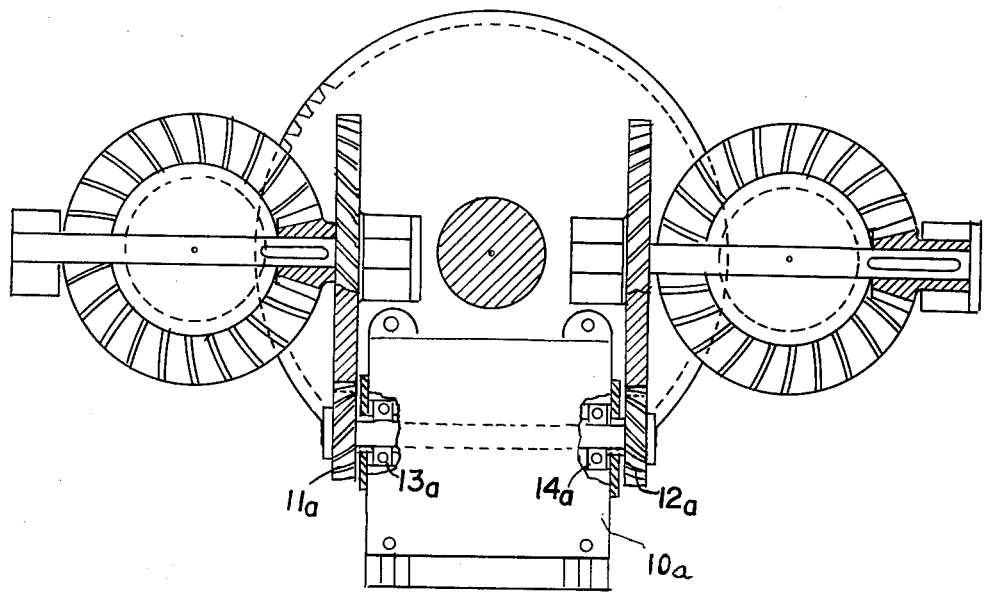
FIG. 4 is a view and section similar to FIG. 1, showing a differently positioned drive-motor.

The embodiment illustrated in FIG. 4 shows the electric motor 10a placed between the coaxial pinions 11a, 12a. These pinions are secured on opposite sides of the motor frame to the common motor shaft, that is mounted in the motor frame on ball bearings 13a, 14a. These are made with a slight axial play. Cylindrical roller bearings could also be used instead.

In a slight modification, not illustrated, the motor shaft is a sleeve with internal grooves that extend in axial direction. The pinion shaft extends inside thereof and contains corresponding external grooves. Balls in said grooves connect the sleeve and shaft and provide the necessary axial freedom.

Figure 5:
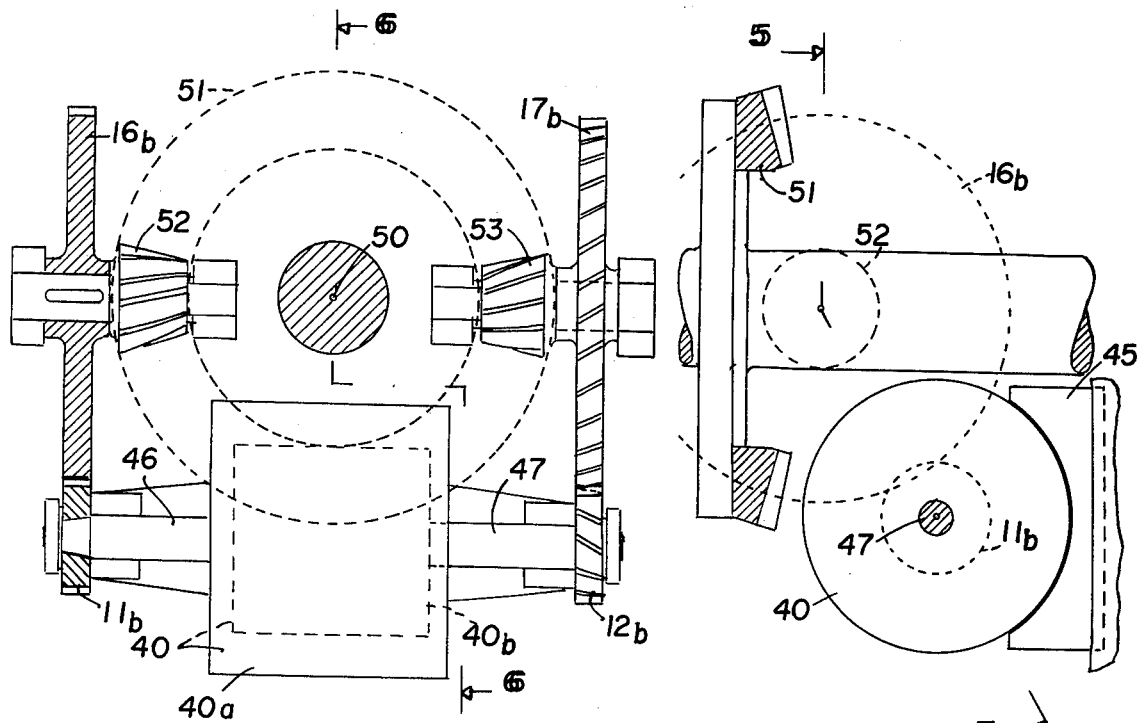
FIG. 5 is a view and section taken along lines 5—5 of FIG. 6, illustrating a modification.
Figure 6:
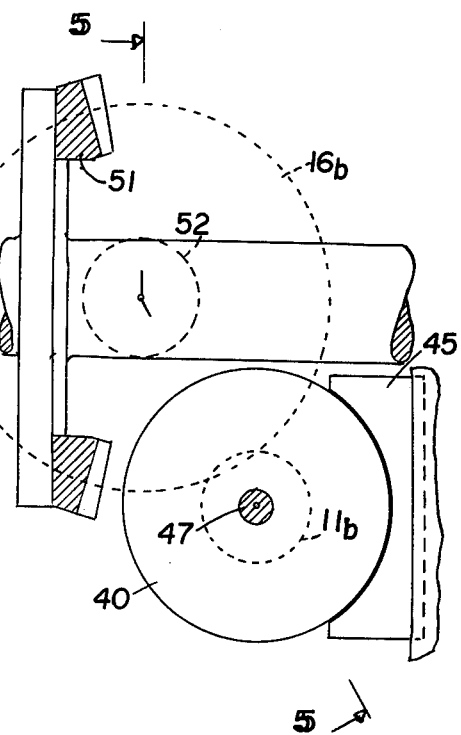
FIG. 6 is a side-view and partly a section thereof, looking in direction 6—6 of FIG. 5.

An altogether different embodiment will now be described with FIGS. 5 and 6. Here the equal loads in the two branches of the drive are attained by using a motor having counter-rotating elements. While the conventional motor contains a stator and a rotor, the motor here used has two oppositely turning rotors. What was the stator before now turns in the opposite direction of the original rotor. Such counter-rotating motors are known art.

At opposite rotational speeds of say 1800 r.p.m. the electric effect is the same as if a conventional motor were to turn at 3600 r.p.m. Such a motor is much smaller than a conventional motor turning at 1800 r.p.m. On the other hand, if the motor has the size of a conventional motor rotating at 1800 r.p.m., its two elements turn only at 900 r.p.m., and save a 1:2 reduction step in the train.

The torque transmitted to each of the counter-rotating members is opposite and exactly equal. It does not require helical pinions of opposite hand to accomplish this.

Motor 40 comprises the coaxial counter-rotating parts 40a, 40b made in any suitable known way. Rotor part 40a is shown embracing the inner rotor part 40b. The parts rotate pinions 11b, 12b equally in opposite directions. They are very diagrammatically shown in FIGS. 5 and 6 and are rotatably mounted on a slide 45. The cylindrical pinions 11b, 12b are secured to the ends of the shafts 46, 47. Adjustment of slide 45 permits to change the pinion size and thereby the ratio.

The pinions 11*b*, 12*b* mesh with coaxial cylindrical gears 16*b*, 17*b* whose axis intersects the axis 50 of the final drive gear 51 at right angles and is parallel to the axis of the pinions 11*b*, 12*b*. Rigidly connected with the gears 16*b*, 17*b* are spiral bevel pinions 52, 53 respectively. They mesh with the same final drive gear 51, here a spiral bevel gear.

Only a double reduction is used in this illustrated case. However triple reduction could also be used if desired.

While the invention has been described in connection with several embodiments thereof, it should be understood that it is capable of much further modification. For definition of its scope it is relied on the appended claims.

I claim:

1. A reduction drive comprising
an electric motor,
two axially spaced cylindrical pinions coaxial with the motor and rigid with each other,
said pinions contain helical teeth of equal lead and opposite hand and are rotatably mounted for axial self-adjustment to equalize their loads,
said pinions mesh with two coaxial cylindrical gears respectively whose axis is parallel to the pinion axis,
a rotating power consumer having a plurality of working parts spaced about its axis of rotation,
a final drive gear forming part of said power consumer,
two pinions meshing with said final drive gear and being spaced about the axis of the drive gear,
each of the last-named pinions being operatively connected with one of said cylindrical gears.

2. A reduction drive according to claim 1, wherein the motor is mounted for adjustment in a plane parallel to the motor axis radially towards and away from said helical gears, permitting simple conversion to a different ratio by changing only the pair of helical pinions.

3. A reduction drive according to claim 1, wherein said pinions coaxial with the motor mesh with two helical gears respectively whose axes are parallel to the motor axis and intersect the axis of the final drive-gear at right angles,
each of said helical gears is connected with a bevel pinion coaxial therewith, that meshes with a bevel gear whose axis is parallel to the axis of said final drive-gear,
and each of said two bevel gears contains a cylindrical pinion in mesh with the single cylindrical final drive-gear of the power consumer.

4. A reduction drive for mixers and aerators, comprising
an electric motor that contains two coaxial counter-rotating rotors electrically acting on each other to transmit opposite and essentially equal torques,
a rotating power consumer having a plurality of working parts spaced about its axis of rotation,
a final drive-gear rigid therewith,
said axis being offset from and extending at right angles to the direction of the motor axis,
two coaxial toothed members rigid respectively with the shafts of said rotors and projecting from opposite sides of said motor, with the motor between them,
said toothed members mate with two gears respectively to effect a gear reduction,
the axes of said two mating gears extending in the same direction,
and two pinions coaxial with said mating gears and respectively connected therewith,
said two pinions mesh with said final drive-gear and are spaced about its axis.

* * * * *